US012554917B1

(12) United States Patent
Shrivastava et al.

(10) Patent No.: US 12,554,917 B1
(45) Date of Patent: Feb. 17, 2026

(54) ETCHING SHAPE INSERTION BASED ON SPACING RULE

(71) Applicant: Cadence Design Systems, Inc., San Jose, CA (US)

(72) Inventors: Sachin Shrivastava, Noida (IN); Deepak Karnatak, Ghaziabad (IN); Vishal Rastogi, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 532 days.

(21) Appl. No.: 18/105,661

(22) Filed: Feb. 3, 2023

(51) Int. Cl.
| | | |
|---|---|---|
| *G03F 1/80* | (2012.01) | |
| *G03F 7/20* | (2006.01) | |
| *G06F 30/392* | (2020.01) | |
| *G06F 30/398* | (2020.01) | |
| *G03F 7/00* | (2006.01) | |
| *G06F 115/12* | (2020.01) | |
| *G06F 119/02* | (2020.01) | |
| *G06F 119/18* | (2020.01) | |
| *G06F 119/22* | (2020.01) | |

(52) U.S. Cl.
CPC .......... *G06F 30/398* (2020.01); *G06F 30/392* (2020.01); *G03F 1/80* (2013.01); *G03F 7/20* (2013.01); *G03F 7/70653* (2023.05); *G03F 7/70681* (2023.05); *G06F 2115/12* (2020.01); *G06F 2119/02* (2020.01); *G06F 2119/18* (2020.01); *G06F 2119/22* (2020.01)

(58) Field of Classification Search
CPC .. G06F 30/398; G06F 30/392; G06F 2115/12; G06F 2119/02; G06F 2119/18; G06F 2119/22; G03F 1/80; G03F 7/20; G03F 7/70653; G03F 7/70681

USPC ..... 716/122, 126, 111, 136, 137, 54, 55, 56, 716/51; 700/109, 120, 121; 430/4, 5; 378/34, 35

See application file for complete search history.

(56) References Cited

U.S. PATENT DOCUMENTS

| | | | | |
|---|---|---|---|---|
| 5,877,091 A | * | 3/1999 | Kawakami ............ | H01L 21/768 257/781 |
| 6,330,707 B1 | * | 12/2001 | Shinomiya ............ | G06F 30/394 716/130 |
| 6,996,507 B1 | * | 2/2006 | Myr ....................... | G06Q 10/06 703/2 |
| 7,433,017 B2 | * | 10/2008 | Hirayanagi ........... | G03F 9/7034 378/34 |

(Continued)

FOREIGN PATENT DOCUMENTS

| | | | | | |
|---|---|---|---|---|---|
| JP | 2019114568 A | * | 7/2019 | | |
| KR | 2008069285 A | * | 7/2008 | ......... | G03F 7/70783 |
| KR | 2009098192 A | * | 9/2009 | ............... | G03F 1/36 |

*Primary Examiner* — Phallaka Kik

(74) *Attorney, Agent, or Firm* — Schwegman Lundberg & Woessner, P.A.

(57) ABSTRACT

Various embodiments provide for inserting an etching shape in a circuit design based on one or more spacing rules, which can be part of electronic design automation (EDA). Some embodiments described herein address wire-end spacing violations for abutted cell placements by enabling one or more etching shapes to be inserted during block implementations, without needing to insert the etching shape at a top level of a circuit design. Additionally, some embodiments described herein address violations of one or more height rules by supporting variable trim height while ensuring that no new violation is introduced with a new etching shape.

20 Claims, 12 Drawing Sheets

(56) References Cited

U.S. PATENT DOCUMENTS

| | | | |
|---|---|---|---|
| 7,661,078 B1* | 2/2010 | Noice | G06F 30/39 |
| | | | 716/136 |
| 8,030,222 B2* | 10/2011 | Tran | H01L 21/32139 |
| | | | 257/E21.24 |
| 8,438,506 B2* | 5/2013 | Sweis | G03F 1/36 |
| | | | 716/54 |
| 9,740,814 B1* | 8/2017 | Ghosh | G03F 7/70433 |
| 10,192,021 B1* | 1/2019 | Raj | G06F 30/398 |
| 10,296,703 B1 | 5/2019 | Juneja et al. | |
| 11,734,485 B1* | 8/2023 | Posser | G06F 30/392 |
| | | | 716/129 |
| 11,868,698 B1* | 1/2024 | Tygert | G06F 30/398 |
| 2003/0064298 A1* | 4/2003 | Broeke | G03F 1/36 |
| | | | 430/296 |
| 2004/0248043 A1* | 12/2004 | Shiraishi | G03F 7/701 |
| | | | 430/311 |
| 2005/0196685 A1* | 9/2005 | Wang | G03F 1/70 |
| | | | 430/5 |
| 2005/0210434 A1* | 9/2005 | Rouch | G06F 11/60 |
| | | | 716/102 |
| 2006/0073686 A1* | 4/2006 | Zach | G03F 7/70641 |
| | | | 430/311 |
| 2006/0085772 A1* | 4/2006 | Zhang | G03F 7/705 |
| | | | 716/52 |
| 2006/0266243 A1* | 11/2006 | Percin | G03F 7/70441 |
| | | | 430/30 |
| 2008/0276213 A1* | 11/2008 | Aoki | H01L 23/5225 |
| | | | 716/129 |
| 2009/0213354 A1* | 8/2009 | Sandstrom | G03F 7/701 |
| | | | 355/71 |
| 2010/0030545 A1* | 2/2010 | Uno | G03F 1/68 |
| | | | 703/13 |
| 2011/0140278 A1* | 6/2011 | Chen | G03F 1/36 |
| | | | 716/108 |
| 2012/0124536 A1* | 5/2012 | Sharma | G06F 30/398 |
| | | | 716/112 |
| 2012/0151428 A1* | 6/2012 | Tanaka | G01B 15/04 |
| | | | 716/112 |
| 2012/0235242 A1* | 9/2012 | Blatchford, Jr | H01L 21/28123 |
| | | | 257/E21.409 |
| 2013/0198707 A1* | 8/2013 | Manakli | G06F 30/00 |
| | | | 716/111 |
| 2014/0149953 A1* | 5/2014 | Davidovic | G06F 30/398 |
| | | | 716/112 |
| 2014/0252639 A1* | 9/2014 | Okada | G06F 30/398 |
| | | | 257/773 |
| 2016/0299418 A1* | 10/2016 | Hung | G03F 1/36 |
| 2018/0204719 A1* | 7/2018 | Ma | H01L 21/0273 |
| 2021/0240902 A1* | 8/2021 | Ku | H10D 62/121 |
| 2022/0335200 A1* | 10/2022 | Tseng | G06F 30/367 |
| 2023/0009894 A1* | 1/2023 | Tung | H10D 84/853 |
| 2024/0126183 A1* | 4/2024 | Hamouda | G03F 7/70441 |
| 2024/0203748 A1* | 6/2024 | Zalkovskij | H01L 21/31144 |
| 2024/0354482 A1* | 10/2024 | Li | G06F 30/392 |
| 2025/0077758 A1* | 3/2025 | Martinello | G06F 30/398 |
| 2025/0362619 A1* | 11/2025 | Hamouda | G03F 7/706839 |

\* cited by examiner

ETCHING SHAPE INSERTION BASED ON SPACING RULE

TECHNICAL FIELD

Embodiments described herein relate to circuit design and, more particularly, to systems, methods, devices, and instructions for inserting an etching shape in a circuit design based on one or more spacing rules, which can be part of electronic design automation (EDA).

BACKGROUND

For certain circuit design technology nodes, such as self-aligned double patterning (SADP), EDA software systems can enable placement of metal wires (e.g., metal traces) end-to-end at less than a design rule constraint (DRC) spacing requirement using an etching shape, which can trim or cut one or more metal shapes of a circuit design. In doing so, an etching shape can allow more functionality to be included in a given area of a physical circuit. Such an etching shape can include a trim metal or a cut metal. For example, based on one or more constraints (e.g., trim constraints), an etch shape engine (e.g., trim engine) of an EDA can facilitate insertion of an etching shape (e.g., a trim or a cut metal), a bridge metal, and a patch metal in a space (e.g., gap) between two wire ends to avoid end line spacing violations. In particular, an etch shape engine can identify all wire ends, identify pairs of wire ends having a space (e.g., a gap) within a spacing value, and process the space between each pair. The processing of an individual space between two wire ends can comprise identifying and removing any bad or redundant etching shapes (e.g., dangling trims or bad trims); inserting a new etching shape in the space in accordance with one or more DRCs; and rerunning one or more DRC checks and removing/correcting violating etching spaces.

BRIEF DESCRIPTION OF THE DRAWINGS

Various ones of the appended drawings merely illustrate various embodiments of the present disclosure and should not be considered as limiting its scope.

DETAILED DESCRIPTION

Figure 1:
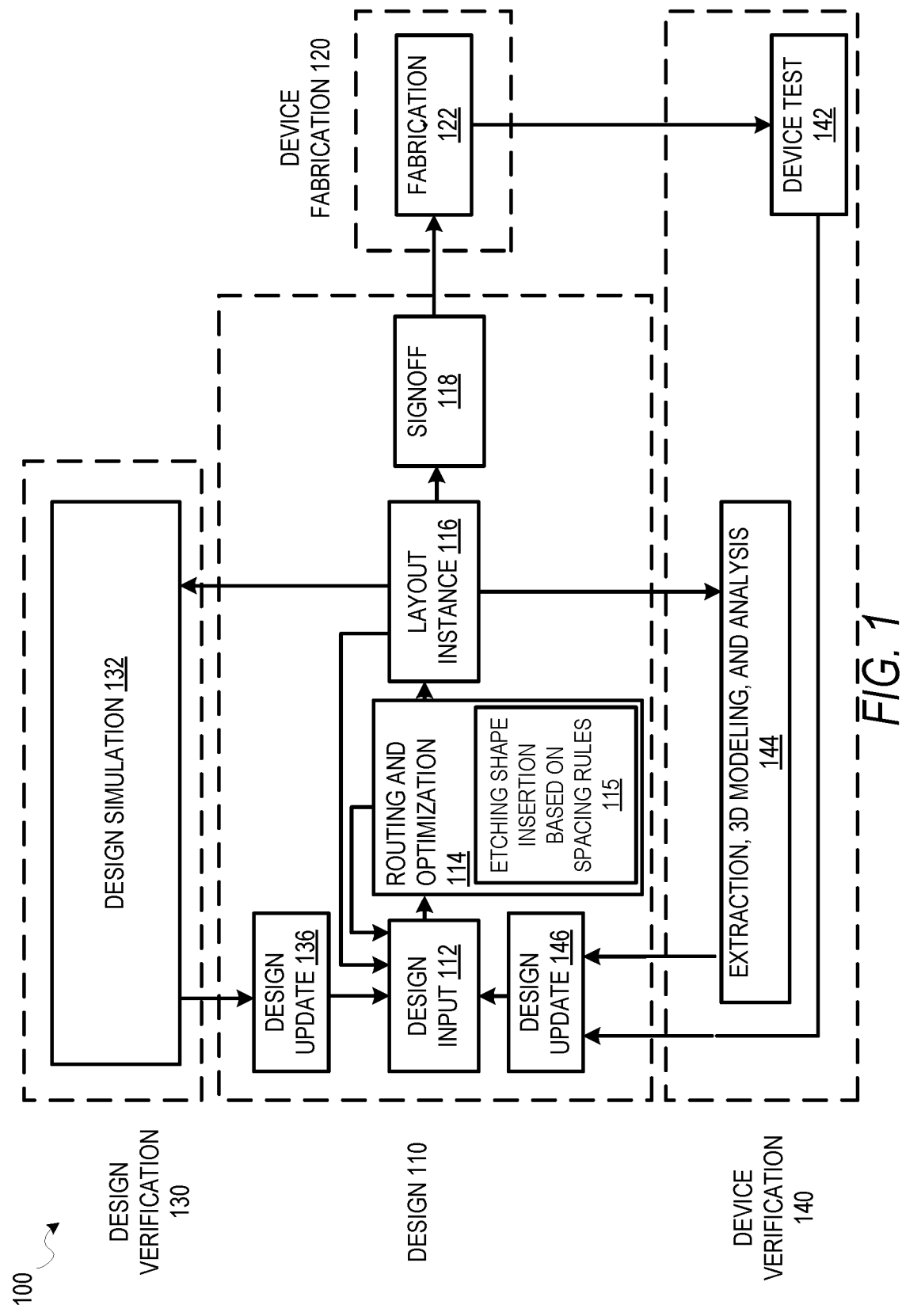
FIG. 1 is a diagram illustrating an example design process flow for inserting an etching shape in a circuit design based on one or more spacing rules, according to some embodiments.

While an etching shape can help to include more functionality in a physical circuit, the use of the etching shape can introduce challenges due to certain DRCs, such as complex trim DRCs. Advances in circuit design flow and manufacturing processes can render trim shape management even more challenging. For example, one challenge can relate to abutted block (e.g., cell) placements, which can cause wire-end (or line-end) spacing violations between wires in different hierarchical blocks (e.g., DRC-clean blocks) of a circuit design. Traditionally, these violations are fixed using one or more etching shapes at a top-level of a circuit design. For example, a user can manually add the one or more etching shapes at the top level. Unfortunately, because the etch shapes and wire-ends are at different levels in the hierarchy, this can result in additional etching shape management issues (e.g., trim management issues since an association between trim and wire-ends is lost) and leads to several problems during top-level editing. Another challenge can relate to one or more height rules (e.g., trim height rules), which can be particularly complex for smaller node technologies (e.g., 5 nm or smaller) . . . . Conventional methods for addressing neighborhood-dependent trim height violation include a user manually fixing such violations by hand, which can lead to severe convergence issues.

Various embodiments provide for inserting an etching shape (e.g., a trim or cut metal) in a circuit design based on one or more spacing rules, which can be part of EDA. Some embodiments described herein address wire-end spacing violations for abutted cell placements by enabling one or more etching shapes to be inserted during block implementations, without needing to insert the etching shape at a top level of a circuit design. For example, an embodiment can implement a circuit design flow where an etching shape (e.g., trim) can be inserted between a wire-end and a boundary of a block to address one or more potential violations caused by the block abutting one or more other blocks. Additionally, some embodiments described herein address violations of one or more height rules (e.g., trim height rules) by supporting variable trim height while ensuring that no new violation is introduced with a new etching shape. For example, an embodiment can implement a correct-by-construct approach of etching shape (e.g., trim) placement such that a generated/inserted etching shape cannot have any height (e.g., trim height) or spacing (e.g., trim-trim spacing) violations. As used herein, a spacing rule can include an etching space height (e.g., trim height rule) or an etching shape-etching shape space rule (e.g., trim-trim spacing rule).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for inserting an etching shape in a circuit design based on one or more spacing rules, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. Though not shown, the routing and optimization 114 operation can include a clock tree synthesis (CTS) operation, which can generate one or more clock trees that deliver clock signal from clock sources of a circuit design to a plurality of clock tree leaf nodes comprising clock tree pins (e.g., of circuit devices, such as flip-flops) within the circuit design. The routing and optimization 114 operation may also include other operations not shown, such as those relating to floorplanning, placement, post-placement optimization, and post-routing optimization. As shown, the routing and optimization 114 operation includes an etching shape insertion based on spacing rules operation 115, which may be performed in accordance with various embodiments described herein. For some embodiments, operation 115 can be performed after floorplanning of a circuit design or placement of one or more blocks within the circuit design.

While the design process flow 100 shows optimization occurring prior to a layout instance 116, timing analysis and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

Design inputs are used in the design input 112 operation to generate an initial circuit layout. The design inputs may be further processed during the design input 112 operation via a process, such as logic-synthesis, to generate a circuit netlist mapped to a target standard library manufacturable by the foundry in fabrication 122 operation. After design inputs are used in the design input 112 operation to generate an initial circuit layout, and any of the routing and optimization 114 operations are performed, a resulting layout is generated as the layout instance 116. The netlist as placed by the layout instance 116 describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, three-dimensional (3D) modeling, and analysis 144 operations. Once the device is generated, the device can be tested as part of device test 142 operations and layout modifications generated based on actual device performance.

As described in more detail below, a design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
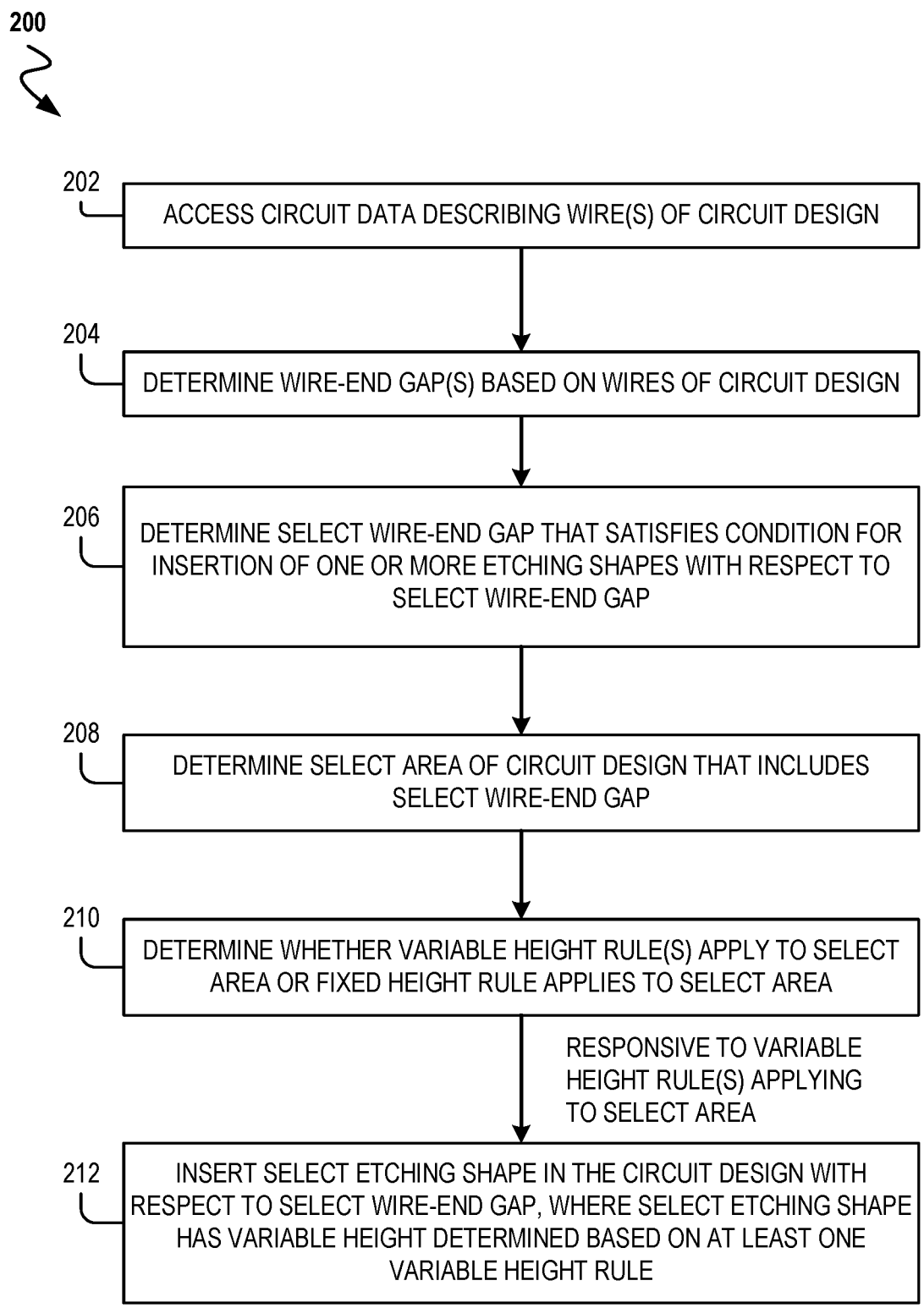
FIGS. 2 and 3 are flowcharts illustrating example methods for inserting an etching shape in a circuit design based on one or more spacing rules, according to some embodiments.
Figure 3:
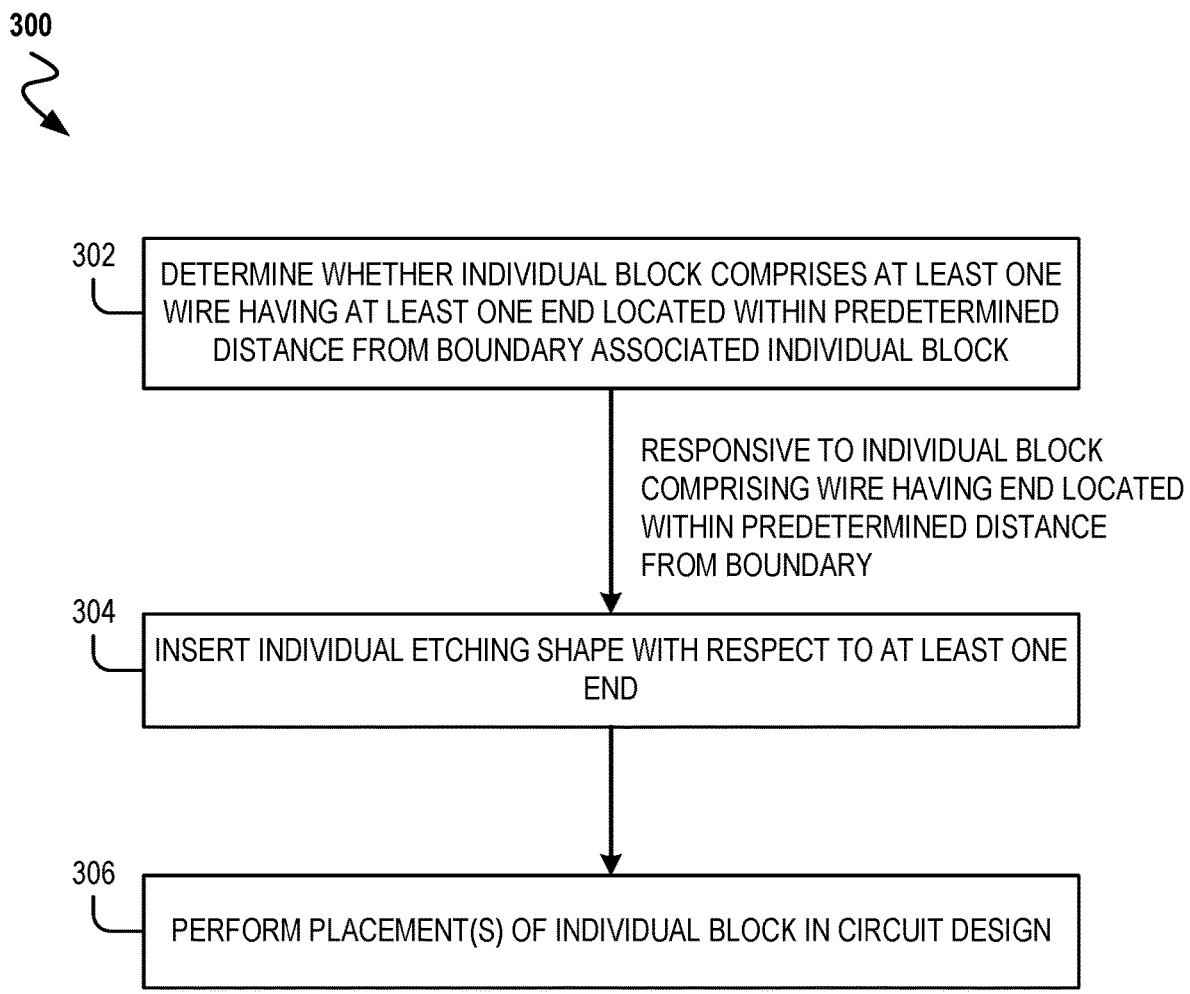

FIGS. 2 and 3 are flowcharts illustrating example methods for inserting an etching shape in a circuit design based on one or more spacing rules, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 2, the flowchart illustrates an example method 200 for inserting a variable height etching shape in a circuit design based on one or more spacing rules, according to some embodiments. For some embodiments, the method 200 is performed after or as part of a routing process performed on a circuit design (e.g., by an EDA software system). For some embodiments, the method 200 is implemented as part of an etching space engine (e.g., trim engine) of an EDA. Such an engine can check a circuit design for spacing rule or etching shape rule violations and can correct such violations by inserting, modifying, or removing etching spaces. An operation of the method 200 (or another method described herein) may be performed by a hardware processor (e.g., central processing unit (CPU) or graphics processing unit (GPU)) of a computing device (e.g., desktop, server, etc.).

As illustrated, operation 202 of the method 200 accesses circuit data that describes a set of wires of a circuit design. Operation 204 determines (e.g., identifies) a set of wire-end gaps based on the set of wires, where each wire-end gap comprises a space between ends of two wires (e.g., pairs of wires) of the set of wires.

Thereafter, operation 206 determines (e.g., identifies) that a select wire-end gap in the set of wire-end gaps satisfies a condition for insertion of one or more etching shapes with respect to the select wire-end gap, where the select wire-end gap can be between a first wire of the set of the wires and a second wire of the set of the wires. The condition can be satisfied, for example, when the gap a between two wire ends is within (e.g., less than) a certain space value, such as a minimum space defined by a spacing rule. For some embodiments, a wire-end gap that satisfies the condition indicates that the wire ends forming the wire-end gap would violate a spacing rule. Operation 206 can be performed as part of a process that processes each identified wire-gap of a circuit design, where the process can identify and remove a bad or a redundant etching space (e.g., trim), can insert an etching space based one or more design rules, and can rerun a DRC check to remove or correct any violating etching spaces.

The method 200 proceeds with operation 208 determining a select area (e.g., neighborhood) of the circuit design that includes (or contains) the select wire-end gap determined by operation 206. For some embodiments, a given area (e.g., neighborhood) of a circuit design can be associated with one or more variable height rules, where each variable height rule can define a different variable height for an etching shape (e.g., trim). For instance, a given variable height rule can define the variable height in terms of different height extensions (e.g., first extension, second extension, third extension, etc.). In this way, different areas can have different variable height rules, and an embodiment can enable the height of an etching shape to be variably selected or adjusted based on neighboring metals and etching shapes.

Operation 210 then determine whether a set of variable height rules (for etching spaces) applies to the select area or a fixed height rule (for etching spaces) applies to the select area. In response to determining that a set of variable height rules applies to the select area, operation 212 inserts a select etching shape in the circuit design with respect to the select wire-end gap, where the select etching shape has a variable height determined based on at least one of a set of variable height rules. Some embodiments select and use the variable height rule that allows the select etching shape to have a largest height possible in view of any neighboring metals or etching shapes.

For some embodiments, operation 212 comprises determining the variable height of the select etching shape and a location (e.g., horizontal or x-axis location) of the select etching shape within the select wire-end gap, and determining the variable height and the location such that the select etching shape avoids creating a new violation of a spacing rule (e.g., spacing rule between an etching shape and a metal shape, or a spacing rule between two etching shapes). For instance, operation 212 can determine the variable height and the location of the select etching shape by: determining one or more avoidance (or keep-out) regions associated with one or more shapes (e.g., metal shapes or etching shapes) of the circuit design that neighbor the select wire-end gap, where each avoidance region designates an area of the circuit design where the select etching shape should avoid overlap; determining, based on the one or more avoidance regions, one or more available regions designating an area of the circuit design where the select etching shape is permitted to overlap; and determining, based on the one or more available regions, the variable height and the location of the select etching shape. The one or more shapes that neighbor the select wire-end gap can comprise one or more shapes within a predetermined distance (or certain proximity) to the select wire-end gap. To determine the one or more avoidance regions associated with the one or more shapes, an embodiment can determine at least one avoidance region (of the one or more avoidance regions) based on a minimum vertical space required between the etching shape and at least one of the one or more shapes, where the minimum vertical space is defined by a spacing rule. Alternatively, to determine the one or more avoidance regions associated with the one or more shapes, an embodiment can determine at least one avoidance region (of the one or more avoidance regions) based on a minimum vertical space required between the new etching shape and another etching shape applied to at least one of the one or more shapes, where the minimum vertical space is defined by a spacing rule (e.g., etching space-etching space spacing rule).

Alternatively, in response to determining that a fixed height rule applies to the select area, an operation can insert an etching shape in the circuit design with respect to the select wire-end gap that has a fixed height defined by the fixed height rule (e.g., maximum trim height possible for the circuit design).

More regarding determining a variable height and a location of an etching shape is described with respect to FIGS. 6 through 10.

Referring now to FIG. 3, the flowchart illustrates an example method 300 for inserting an etching shape in a block of a circuit design based on one or more spacing rules, according to some embodiments. For some embodiments, the method 300 is performed after or as part of a routing process performed on a circuit design (e.g., by an EDA software system). Additionally, the method 300 can be with respect to an individual block prior to the individual block being placed (e.g., via a placement process) in a circuit design. For some embodiments, the method 300 is implemented as part of an etching space engine (e.g., trim engine) of an EDA.

For various embodiments, prior to placement of an individual block in a circuit design, operation 302 of the method 300 determines whether the individual block comprises at least one wire having at least one end located within a predetermined distance from a boundary associated the individual block. For example, the boundary can comprise a placement and routing (PR) boundary associated with the individual block, where the PR boundary can designate a region in which placement is performed or routing is constrained for the individual block. For some embodiments, the predetermined distance is defined by a spacing rule, such as one that defines a minimum space between wire ends.

In response to determining that the individual block comprises the at least one wire having the at least one end located within the predetermined distance from the boundary, operation 304 inserts an individual etching shape in the individual block (e.g., within the design of the individual block) with respect to the at least one end. For some embodiments, the insertion of the individual etching shape is performed prior to an instance of the individual block being placed within the circuit design. Mode of operation can determine where the individual etching shape is inserted with respect to the at least one end. For example, the individual etching shape can be inserted such that the individual etching shape is fully inside the individual block, outside the individual block, or straddling the boundary associated with the individual block. For instance, where inserted inside, the individual etching shape can be inserted with respect to the at least one end such that the individual etching shape is placed within the boundary associated with the individual block and with one edge of the individual etching shape touching the boundary. Where inserted outside, the individual etching shape can be inserted with respect to the at least one end such that the individual etching shape is placed outside the boundary associated with the individual block and with one edge of the individual etching shape touching the boundary. Where inserted in a straddle location, the individual etching shape can be inserted with respect to the at least one end such that the individual etching shape is placed on (e.g., straddling) the boundary associated with the individual block. Depending on the embodiment, the mode of operation can be determined, defined, or set by a user (e.g., user parameter). For some embodiments, operation 304 is facilitated by placing a dummy edge in proximity to the boundary (e.g., based on the mode of operation), where the at least one end and the dummy edge form a temporary wire-end gap. In particular, the dummy edge can be placed relative to the boundary such that the temporary wire-end gap satisfies the condition for insertion of one or more etching shapes (e.g., less than the minimum space required by a spacing rule). Thereafter, the individual etching shape can be inserted with respect to the temporary wire-end gap.

Eventually, after operation 304, operation 306 of the method 300 performs one or more placements of the individual block in the circuit design with the individual etching shape included. More regarding inserting an etching shape in a block of a circuit design based on one or more spacing rules is described with respect to FIGS. 4 and 5.

Figure 4:
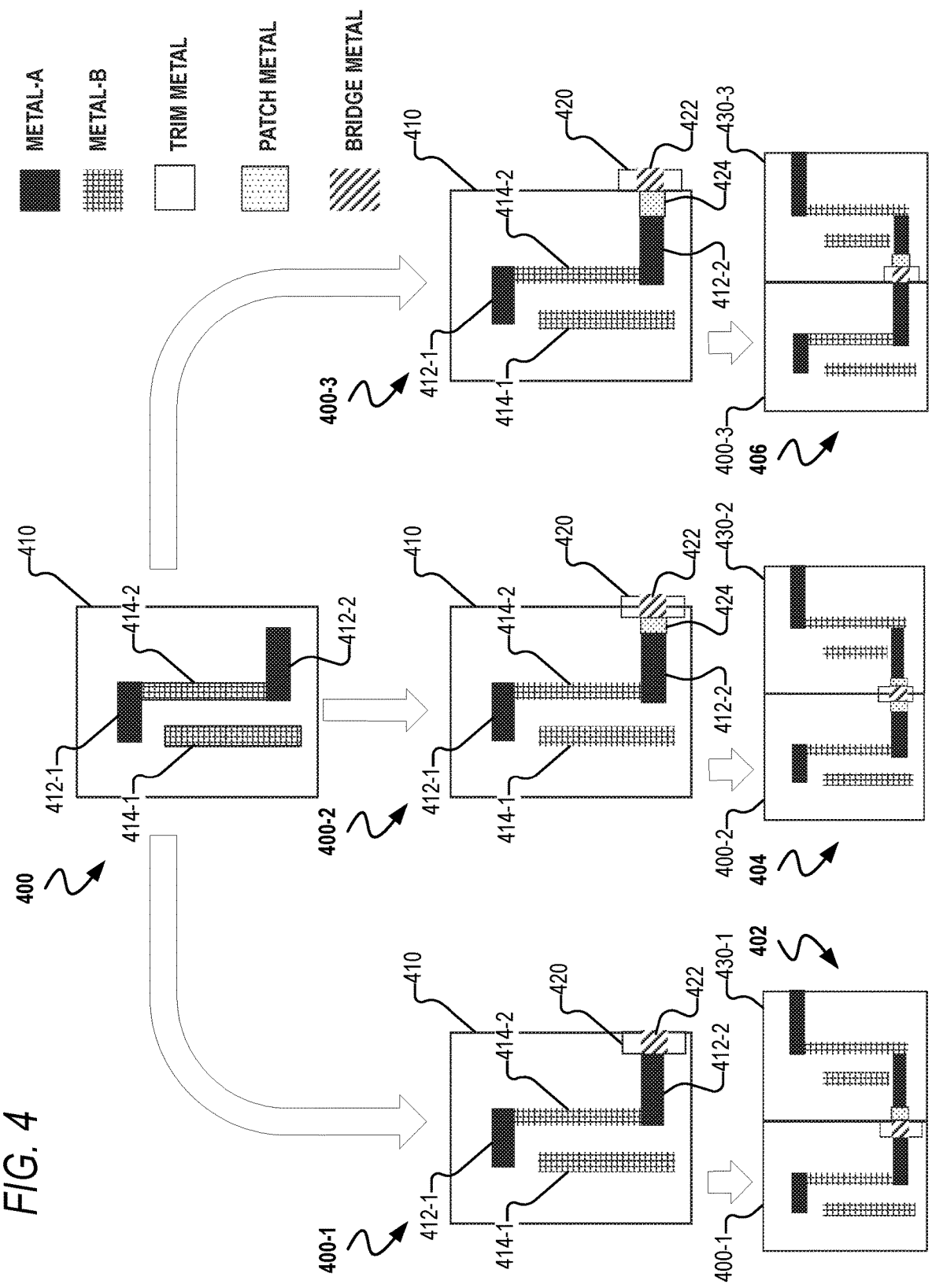
FIG. 4 is a diagram illustrating an example of inserting an etching shape in a block of a circuit design based on one or more spacing rules, according to some embodiments.

FIG. 4 is a diagram illustrating an example of inserting an etching shape in a block 400 of a circuit design based on one or more spacing rules, according to some embodiments. According to various embodiments, an etching shape is inserted with respect to the block 400 prior to placement of the block 400 in a circuit design. In doing so, various embodiments can avoid or fix spacing rule violations by wire ends during block design itself. For some embodiments, the etching space (e.g., trim) is inserted whenever there is a wire end within a distance from a boundary 410, where the distance is defined by a spacing rule. As illustrated, the block 400 comprises a boundary 410 (e.g., PR boundary), and wires 412-1, 412-2 of metal layer A, and wires 414-1, 414-2 of metal layer B. In accordance with some embodiments described herein, an etching shape (e.g., trim) can be: inserted inside the block 400, as illustrated by block 400-1; inserted such that the etching shape straddles the boundary 410, as illustrated by block 400-2; or inserted outside the block 400, as illustrated by block 400-3. As shown, the block 400-1 has an etching shape 420 and a bridge metal 422, where the etching shape 420 and the bridge metal 422 are inserted within the block 400-1 such that an edge of the etching shape 420 and an edge of the bridge metal 422 touch the boundary 410. The block 400-2 has the etching shape 420, the bridge metal 422, and a patch metal 424, where the etching shape 420 and the bridge metal 422 are inserted within the block 400-2 such that both straddle the boundary 410 and the patch metal 424 is coupled to the end of the wire 412-2. The block 400-3 has the etching shape 420, the bridge metal 422, and the patch metal 424, where the etching shape 420 and the bridge metal 422 are inserted outside the block 400-3 such that an edge of the etching shape 420 and an edge of the bridge metal 422 touch the boundary 410. FIG. 4 illustrates (at 402) the result of placement of the block 400-1 and another block 430-1 abutting the block 400-1, illustrates (at 404) the result of placement of the block 400-1 and another block 430-2 the block 400-2, and illustrates (at 406) the result of placement of the block 400-1 and another block 430-3 the block 400-3. As shown the insertion of the etching shape 420 can assist in avoiding spacing rule violations by wire ends.

Figure 5:
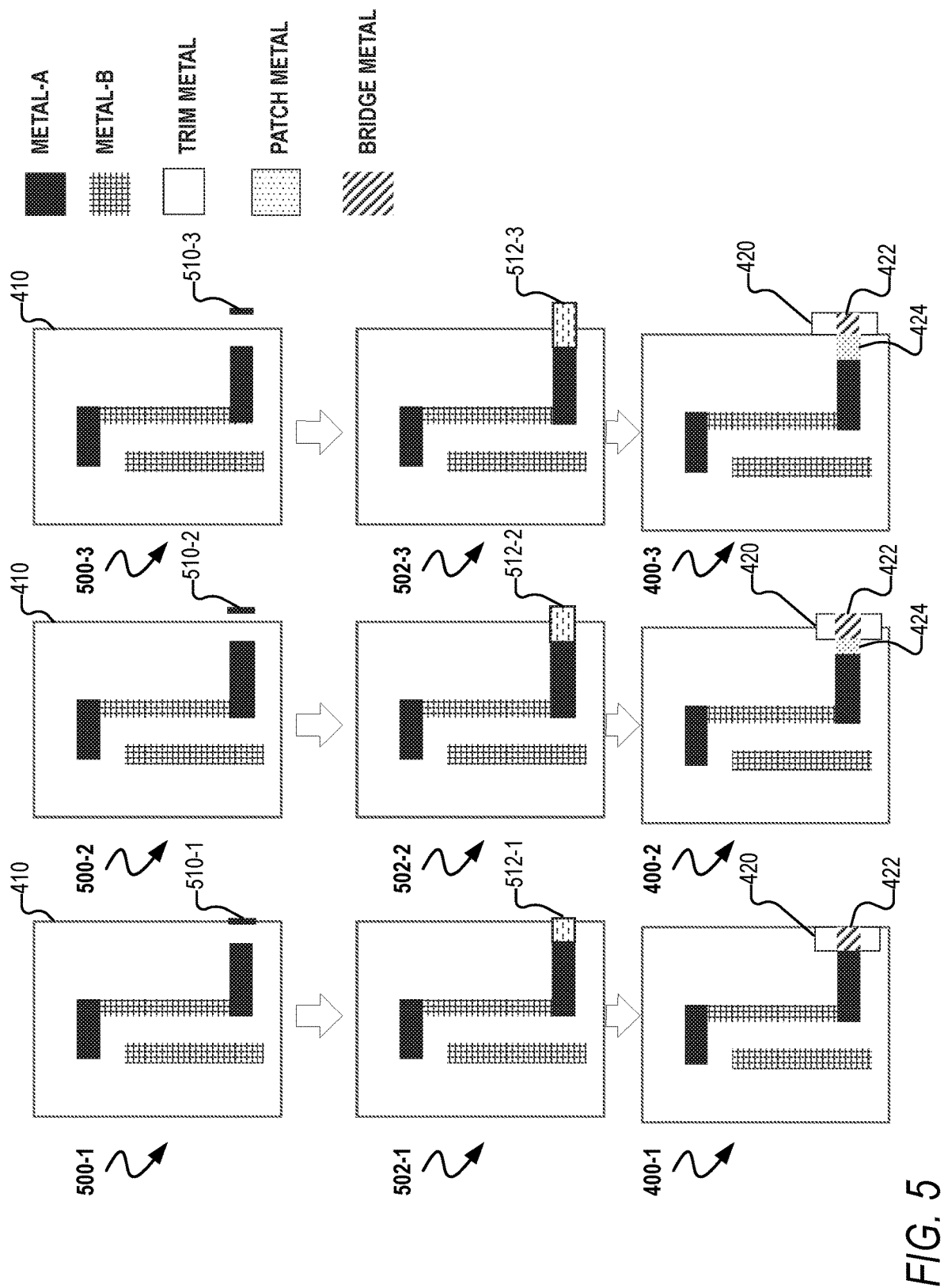
FIG. 5 is a diagram illustrating example implementations for inserting an etching shape in a block of a circuit design based on one or more spacing rules, according to some embodiments.

FIG. 5 is a diagram illustrating example implementations for inserting an etching shape in a block of a circuit design based on one or more spacing rules, according to some embodiments. According to various embodiments, insertion of an etching space with respect to an individual block is facilitated by creating or generating a dummy edge (e.g., dummy wire end) near a boundary (e.g., PR boundary) associated with the individual block, which causes a wire-end gap to be formed. For example, to facilitate insertion of the etching shape 420 inside the block 400 to result in the block 400-1 of FIG. 4, a dummy edge 510-1 is generated and placed on the boundary 410 of the block 400, as shown by block 500-1. Based on the generation of the dummy edge 510-1, a wire-end gap 512-1 is formed (as shown by block 502-1) and the etching shape 420 and the bridge metal 422 are inserted with respect to the wire-end gap 512-1 to result in the block 400-1.

To facilitate insertion of the etching shape 420 with respect to the block 400 to result in the block 400-2 of FIG. 4, a dummy edge 510-2 is generated and placed outside the boundary 410 of the block 400, as shown by block 500-2. Based on the generation of the dummy edge 510-2, a wire-end gap 512-2 is formed (as shown by block 502-2) and the etching shape 420, the bridge metal 422, and the patch metal 424 are inserted with respect to the wire-end gap 512-2 to result in the block 400-2.

To facilitate insertion of the etching shape 420 outside the block 400 to result in the block 400-3 of FIG. 4, a dummy edge 510-3 is generated and placed outside the boundary 410 of the block 400, as shown by block 500-3. Based on the generation of the dummy edge 510-3, a wire-end gap 512-3 is formed (as shown by block 502-3) and the etching shape 420, the bridge metal 422, and the patch metal 424 are inserted with respect to the wire-end gap 512-3 to result in the block 400-3.

Figure 6:
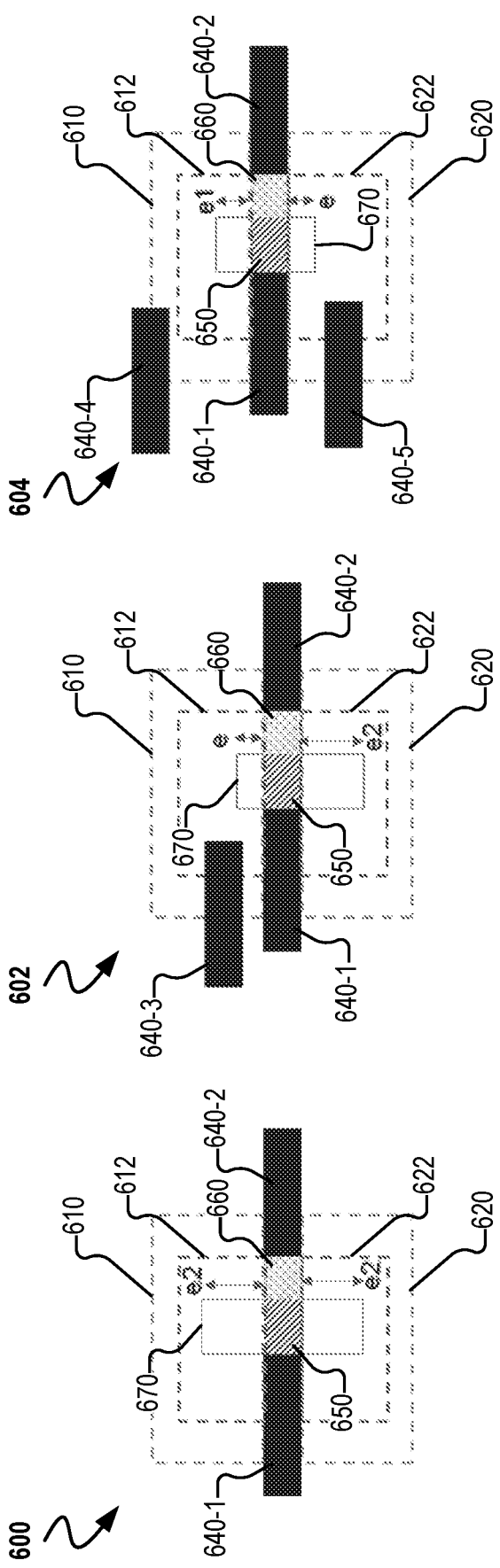
FIG. 6 is a diagram illustrating an example insertion of an etching shape with variable height in different instances, according to some embodiments.

FIG. 6 is a diagram illustrating an example insertion of an etching shape 670 with variable height in different instances, according to some embodiments. In FIG. 6, the etching shape 670, a bridge metal 650, and a patch metal 660 are inserted with respect to a wire-end gap formed between wire 640-1 and wire 640-2. According to various embodiments, variable height of the etching shape 670 is defined with respect to different sized height extensions (e.g., first extension (e), second extension (e1), third extensions (e2)) defined by different variable height rules. An area (e.g., neighborhood) of a circuit design that includes the etching shape 670 determines the different variable height rules available for use. Additionally, various embodiments use the variable height rule (and associated height extension) that maximizes the height of the etching shape 670 while avoiding creation of a spacing rule violation. As shown, avoidance (e.g., keep-out) regions 610, 612, 620, 622 are determined based on the position and variable height rules available for the etching shape 670. In 600, since there are no shapes in the avoidance regions 610, 612, 620, 622, a largest variable height (extension (e2)) is used with respect to etching shape 670, thereby resulting in a top variable height of e2 and a bottom variable height of e2.

In 602, a shape (wire 640-3) exists in both avoidance regions 610, 612 and, as such, the variable height rules associated with those avoidance regions 610, 612 (extensions e1 and e2) cannot be used with respect to a top variable height of the etching shape 670. As a result, only one variable height rule (extension e) is available for the top variable height of the etching shape 670. However, since there are not shapes in the avoidance regions 620, 622, a largest variable height (extension (e2)) is used with respect to bottom variable height of the etching shape 670.

In 604, a first shape (wire 640-4) exists in the avoidance region 610 and, as such, the variable height rule associated with those avoidance regions 610 (extension e2) cannot be used with respect to a top variable height of the etching shape 670. As a result, since no shape exists in the avoidance region 612, the corresponding variable height rule (extension e1) is used for the top variable height of the etching shape 670. A second shape (wire 640-5) exists in both avoidance regions 620, 622, and, as such, the variable height rules associated with those avoidance regions 620, 622 (extensions e1 and e2) cannot be used with respect to a bottom variable height of the etching shape 670. As a result, only one variable height rule (extension e) is available for the bottom variable height of the etching shape 670.

Figure 7:
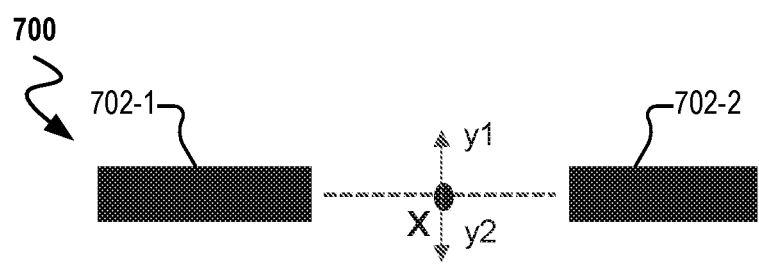
FIG. 7 is a diagram illustrating an example of determining an etching shape with variable height, according to some embodiments.

FIG. 7 is a diagram illustrating an example 700 of determining an etching shape with variable height, according to some embodiments. According to various embodiments, an etching shape is inserted with respect to a wire-end gap such that no new spacing rule violations (e.g., height rule or etching shape-etching shape spacing rule violation) are introduced by the insertion. Accordingly, when an etching shape is inserted with respect to a wire-end gap defined by wires 702-1, 702-2, a horizontal location (x) is determined and variable heights (y1 and y2) are determined such that no spacing rule violations are introduced.

Figure 8:
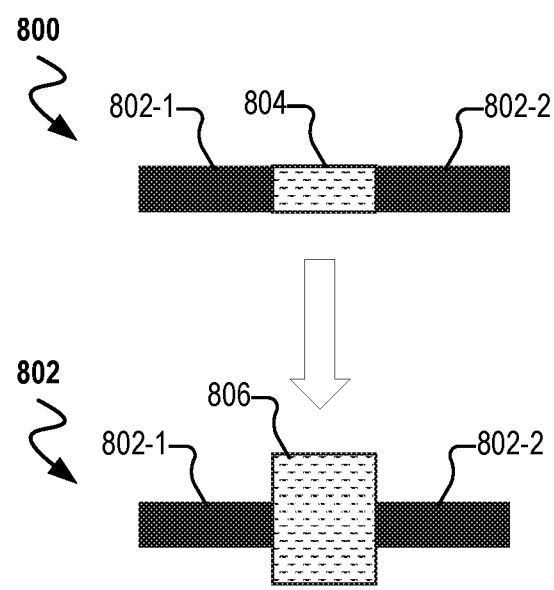
FIGS. 8 through 10 is a diagram illustrating an example of implementing etching shape with variable height, according to some embodiments.
Figure 9:
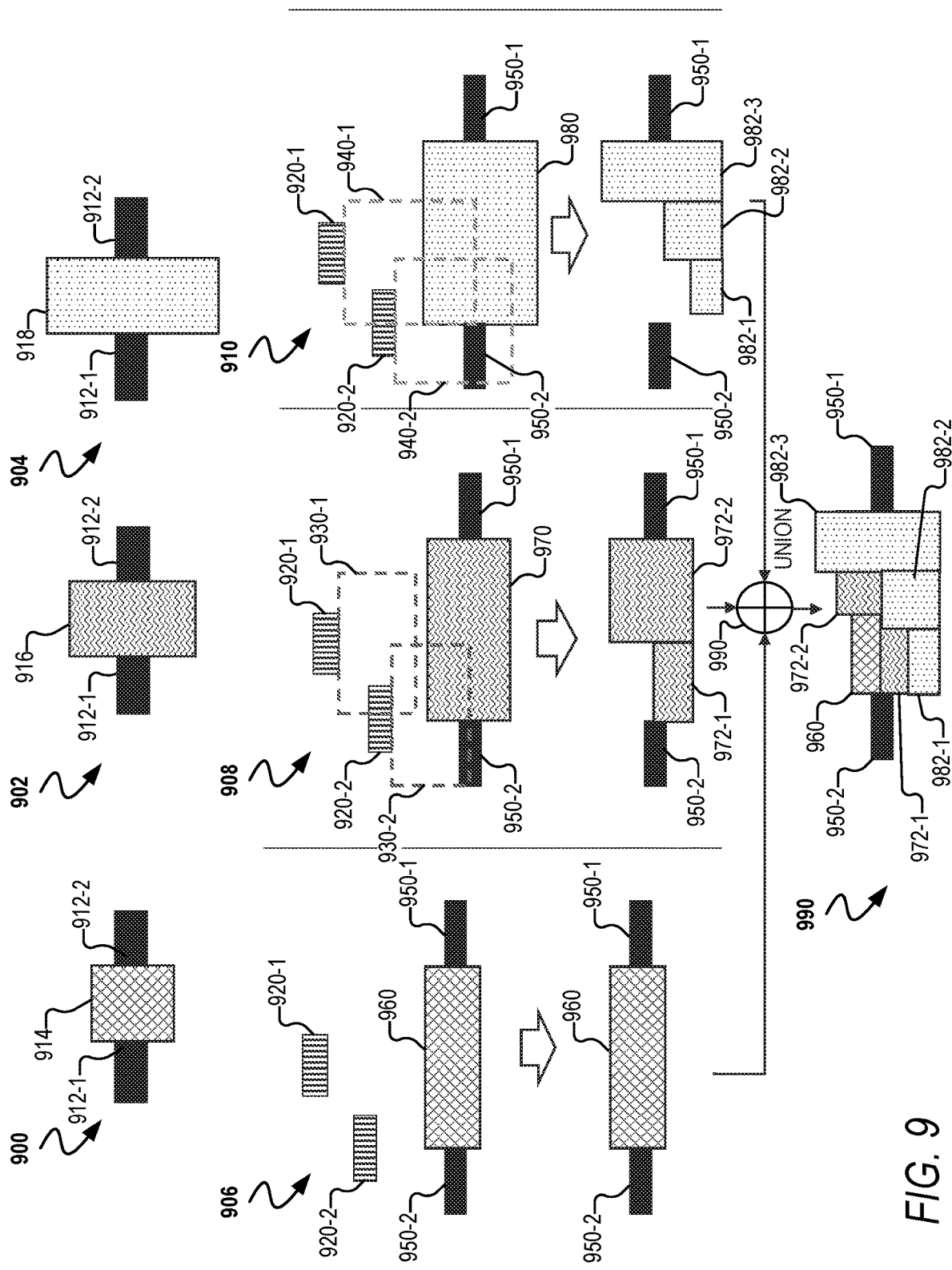
Figure 10:
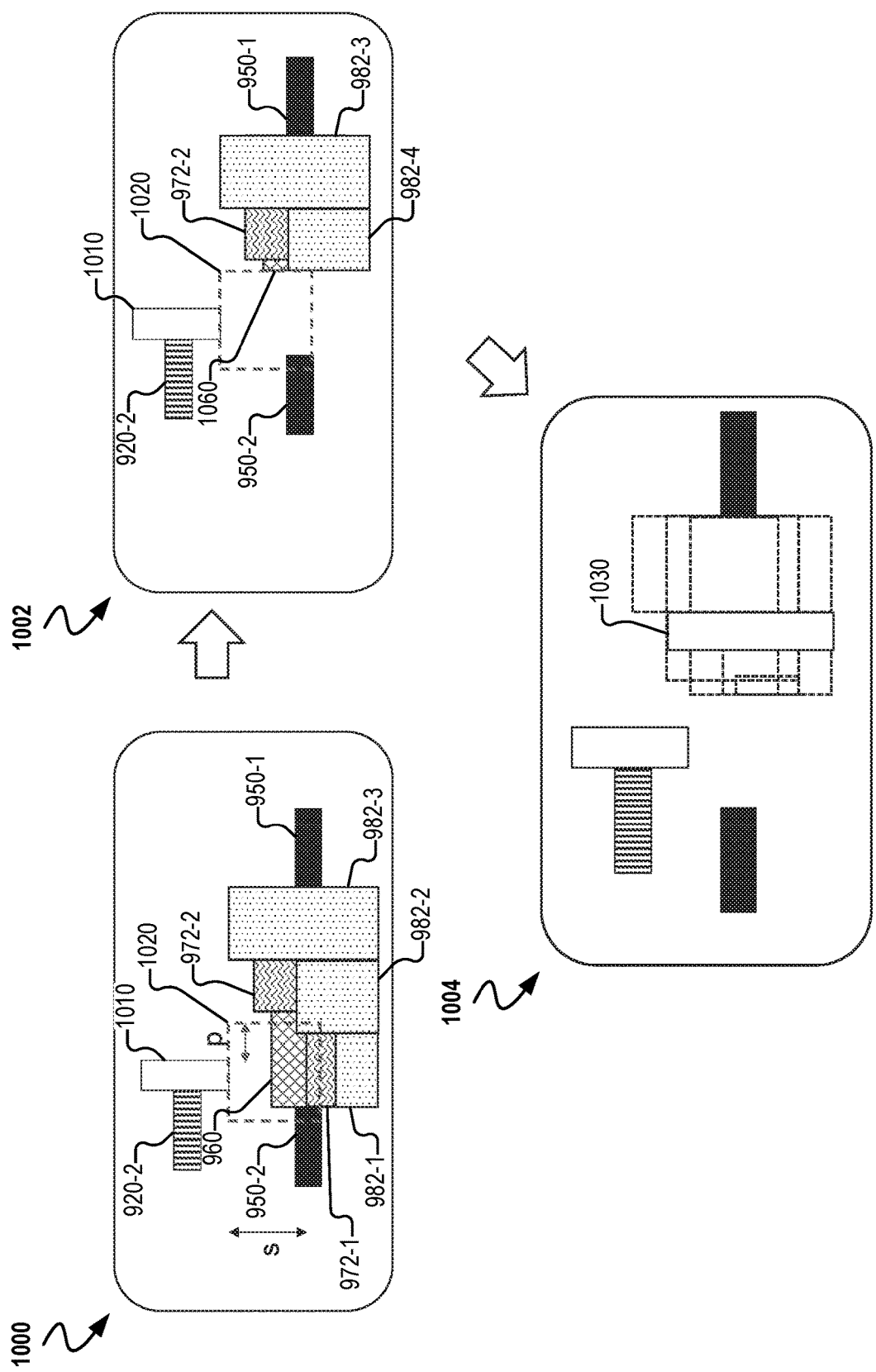

FIGS. 8 through 10 are a diagram illustrating an example of implementing of etching shape with variable height, according to some embodiments. According to some embodiments, a wire-end gap is defined by to the gap between two wire ends and by a height extension corresponding to a variable height rule possible for use with respect to an etching shape inserted to the wire-end gap. Referring now to FIG. 8, as shown by 800, the ends of wires 802-1, 802-2 define a wire-end gap 804 without any height extensions. At 802, a wire-end gap 806 is shown to be defined by a gap between two ends of wires 802-1, 802-2 and a height extension that corresponds to a variable height rule that applies to gap between the wires 802-1, 802-2.

Some embodiments define a different wire-end gap for each variable height rule. Referring now to FIG. 9, at 900, a wire-end gap 914 is defined by a gap between wires 912-1, 912-2 and by a first height extension (e.g., extension e) as defined by a first variable height rule; at 902, a wire-end gap 916 is defined by a gap between wires 912-1, 912-2 and by a second height extension (e.g., extension e2) as defined by a second variable height rule; and, at 904, a wire-end gap 918 is defined by a gap between wires 912-1, 912-2 and by a third height extension (e.g., extension e2) as defined by a third variable height rule.

The remainder of FIG. 9 illustrates an example of how avoidance regions are determined based on neighboring shapes 920-1, 920-2 (e.g., neighboring wires) for different wire-end gaps between wires 950-1, 950-2. At 906, based on a first variable height rule that defines a first height extension, no avoidance regions are determined from the neighboring shapes 920-1, 920-2, and a wire-end gap 960 is defined by the gap between the wires 950-1, 950-2 and by the first height extension (e.g., extension e) as defined by the first variable height rule. Based on the lack of avoidance regions, the wire-end gap 960 remains as-is.

At 908, based on a second variable height rule that defines a second height extension, avoidance regions 930-1, 930-2 are determined from the neighboring shapes 920-1, 920-2, and a wire-end gap 970 is defined by the gap between the wires 950-1, 950-2 and by the second height extension (e.g., extension e1) as defined by the second variable height rule. Based on the overlap of the avoidance regions 930-1, 930-2 with the wire-end gape 970, a wire-end gap 972 (comprising 972-1, 972-2) results.

At 910, based on a third variable height rule that defines a third height extension, avoidance regions 940-1, 940-2 are determined from the neighboring shapes 920-1, 920-2, and a wire-end gap 980 is defined by the gap between the wires 950-1, 950-2 and by the third height extension (e.g., extension e2) as defined by the third variable height rule. Based on the overlap of the avoidance regions 940-1, 940-2 with the wire-end gap 980, a wire-end gap 982 (comprising 982-1, 982-2, 982-3) results.

A wire-end gap (hereafter, union wire-end gap) resulting from the union of the wire-end gaps 960, 972, 982 is shown at 990. Referring now to FIG. 10, at 1000, an etching shape 1010 is introduced with respect to the neighboring shape 920-2 (e.g., wire). Based on the etching shape 1010 and a spacing rule (e.g., etching shape-etching shape spacing rule defined by parameters s and p), another avoidance region 1020 is determined relative to the etching shape 1010 and considered with respect to the union wire-end gap shown at 990 of FIG. 9. Based on overlap of the avoidance region 1020 and the union wire-end gap, at 1002, the union wire-end gap is further adjusted (e.g., reduced or chopped) to a reduced wire-end gap comprising 1060, 972-2, 982-3, 982-4. Eventually, at 1004, an etching shape 1030 is inserted and positioned within the region defined by the reduced wire-end gap. As noted herein, the etching shape 1030 is positioned (e.g., horizontally) such that the variable height of the etching shape 1030 can be maximized while remaining within the reduced wire-end gap.

Figure 11:
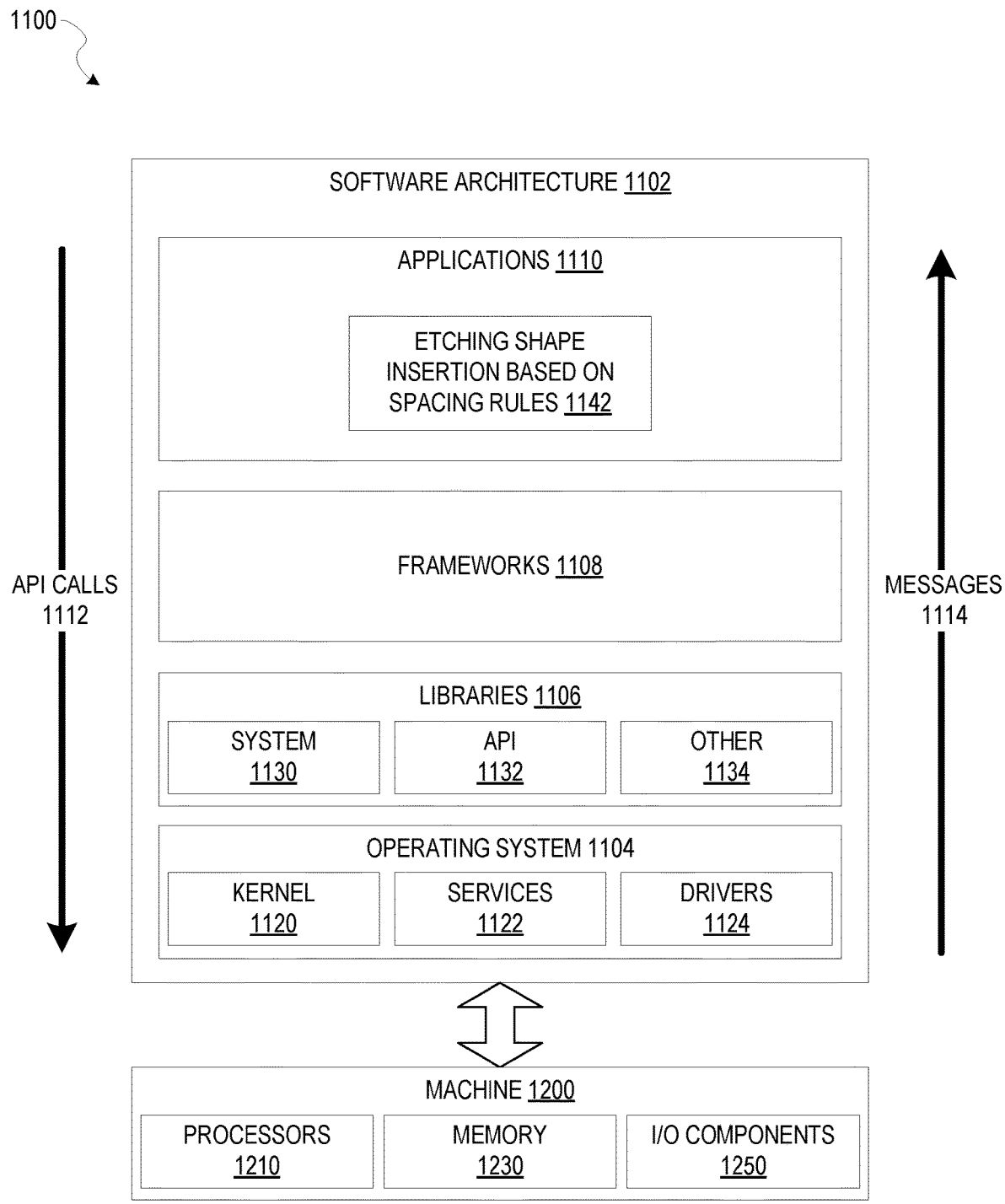
FIG. 11 is a block diagram illustrating an example of a software architecture that may be operating on an EDA computing device and may be used with methods for inserting an etching shape in a circuit design based on one or more spacing rules, according to some embodiments.

FIG. 11 is a block diagram 1100 illustrating an example of a software architecture 1102 that may be operating on an EDA computer and may be used with methods for inserting an etching shape in a circuit design based on one or more spacing rules, according to some embodiments. The software architecture 1102 can be used as an EDA computing device to implement any of the methods described above. Aspects of the software architecture 1102 may, in various embodiments, be used to store circuit designs and to facilitate generation of a circuit design in an EDA environment by inserting an etching shape in a circuit design based on one or more spacing rules.

FIG. 11 is merely a non-limiting example of a software architecture 1102, and it will be appreciated that many other architectures can be implemented to facilitate the functionality described herein. In various embodiments, the software architecture 1102 is implemented by hardware such as a machine 1200 of FIG. 12 that includes processors 1210, memory 1230, and input/output (I/O) components 1250. In this example, the software architecture 1102 can be conceptualized as a stack of layers where each layer may provide a particular functionality. For example, the software architecture 1102 includes layers such as an operating system 1104, libraries 1106, software frameworks 1108, and applications 1110. Operationally, the applications 1110 invoke application programming interface (API) calls 1112 through the software stack and receive messages 1114 in response to the API calls 1112, consistent with some embodiments. In various embodiments, any client device, any server computer of a server system, or any other device described herein may operate using elements of the software architecture 1102. An EDA computing device described herein may additionally be implemented using aspects of the software architecture 1102, with the software architecture 1102 adapted for operating insertion of an etching shape in a circuit design in any manner described herein.

In some embodiments, an EDA application of the applications 1110 performs insertion of an etching shape in a circuit design according to embodiments described herein using various modules within the software architecture 1102. For example, in some embodiments, an EDA computing device similar to the machine 1200 includes the memory 1230 and the one or more processors 1210. The processors 1210 also implement an etching shape insertion based on spacing rules module 1142 for inserting an etching shape in a circuit design based on one or more spacing rules, in accordance with various embodiments described herein.

In various other embodiments, rather than being implemented as modules of the one or more applications 1110, the etching shape insertion based on spacing rules module 1142 may be implemented using elements of the libraries 1106, the operating system 1104, or the software frameworks 1108.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 such as libraries of blocks for use in an EDA environment or other libraries that can provide functions such as memory allocation functions, string manipulation functions, mathematic functions, and the like. In addition, the libraries 1106 can include API libraries 1132 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and 3D in a graphic context on a display), database libraries (e.g., SQLite to provide various relational database functions), web libraries (e.g., WebKit to provide web browsing functionality), and the like. The libraries 1106 may also include other libraries 1134.

The software frameworks 1108 provide a high-level common infrastructure that can be utilized by the applications 1110, according to some embodiments. For example, the software frameworks 1108 provide various graphic user interface (GUI) functions, high-level resource management, high-level location services, and so forth. The software frameworks 1108 can provide a broad spectrum of other APIs that can be utilized by the applications 1110, some of which may be specific to a particular operating system 1104 or platform. In various embodiments, the systems, methods, devices, and instructions described herein may use various files, macros, libraries, and other elements of an EDA design environment to implement insertion of an etching shape in a circuit design based on one or more spacing rules as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 1102, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1200 including processors 1210), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 1200, but deployed across a number of machines 1200. In some embodiments, the processors 1210 or processor-implemented modules are located in a single geographic location (e.g., within a home environment, an office environment, or a server farm). In some other embodiments, the processors or processor-implemented modules are distributed across a number of geographic locations.

Figure 12:
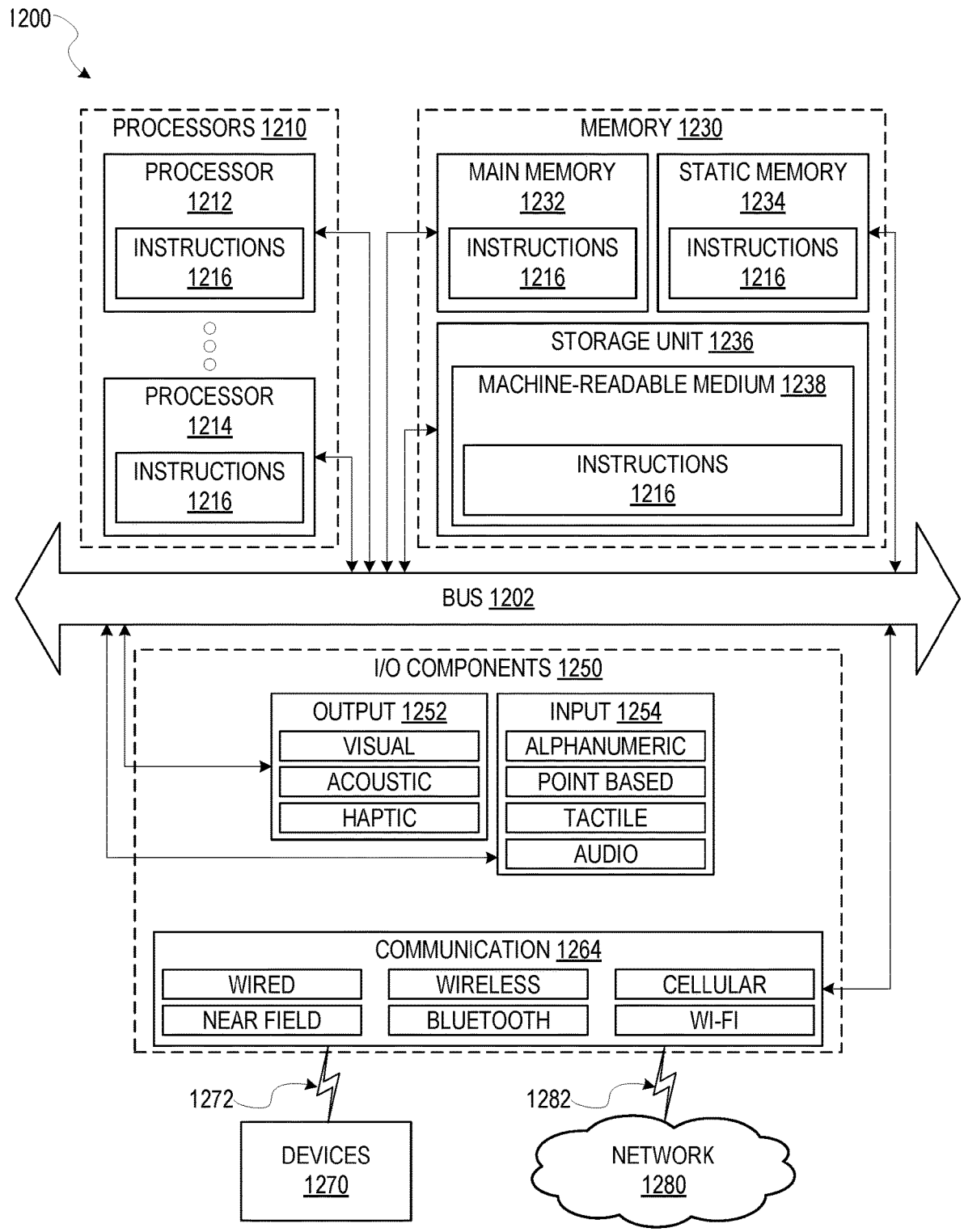
FIG. 12 is a diagram representing a machine in the form of a computer system within which a set of instructions are executed, causing the machine to perform any one or more of the methods discussed herein, according to some embodiments.

FIG. 12 is a diagrammatic representation of the machine 1200 in the form of a computer system within which a set of instructions may be executed for causing the machine 1200 to perform any one or more of the methodologies discussed herein, according to some embodiments. FIG. 12 shows components of the machine 1200, which is, according to some embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein can be executed. In alternative embodiments, the machine 1200 operates as a standalone device or can be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, or any machine capable of executing the instructions 1216, sequentially or otherwise, that specify actions to be taken by the machine 1200.

Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises processors 1210, memory 1230, and I/O components 1250, which can be configured to communicate with each other via a bus 1202. In some embodiments, the processors 1210 (e.g., a CPU, a reduced instruction set computing (RISC) processor, a complex instruction set computing (CISC) processor, a GPU, a digital signal processor (DSP), an ASIC, a radio-frequency integrated circuit (RFIC), another processor, or any suitable combination thereof) include, for example, a processor 1212 and a processor 1214 that may execute the instructions 1216. The term "processor" is intended to include multi-core processors 1210 that may comprise two or more independent processors 1212, 1214 (also referred to as "cores") that can execute the instructions 1216 contemporaneously. Although FIG. 12 shows multiple processors 1210, the machine 1200 may include a single processor 1212 with a single core, a single processor 1212 with multiple cores (e.g., a multi-core processor 1212), multiple processors 1210 with a single core, multiple processors 1210 with multiple cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown, in some embodiments, to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., the instructions 1216) for execution by a machine (e.g., the machine 1200), such that the instructions, when executed by one or more processors of the machine (e.g., the processors 1210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, the communication components 1264 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1270 may be another machine or any of a wide variety of peripheral devices (e.g., a peripheral device coupled via a USB).

In various embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling.

Furthermore, the machine-readable medium 1238 is non-transitory (in other words, not having any transitory signals) in that it does not embody a propagating signal. However, labeling the machine-readable medium 1238 "non-transitory" should not be construed to mean that the machine-readable medium 1238 is incapable of movement; the machine-readable medium 1238 should be considered as being transportable from one physical location to another. Additionally, since the machine-readable medium 1238 is tangible, the machine-readable medium 1238 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to some embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A non-transitory computer-readable medium comprising instructions that, when executed by a hardware processor of a device, cause the device to perform operations comprising:
   accessing circuit data that describes a set of wires of a circuit design;
   determining a set of wire-end gaps based on the set of wires, each wire-end gap comprising a space between ends of two wires of the set of wires;
   determining a select wire-end gap in the set of wire-end gaps that satisfies a condition for insertion of one or more etching shapes with respect to the select wire-end gap;
   determining a select area of the circuit design that includes the select wire-end gap;
   determining whether a set of variable height rules applies to the select area or a fixed height rule applies to the select area; and
   in response to determining that the set of variable height rules applies to the select area, inserting a select etching shape in the circuit design with respect to the select wire-end gap, the select etching shape having a variable height determined based on at least one variable height rule in the set of variable height rules.

2. The non-transitory computer-readable medium of claim 1, wherein the inserting of the select etching shape with respect to the select wire-end gap comprises:
   determining the variable height and a location of the select etching shape within the select wire-end gap such that select etching shape avoids creating a new violation of a spacing rule.

3. The non-transitory computer-readable medium of claim 2, wherein the determining of the variable height and the location of the select etching shape comprises:
   determining one or more avoidance regions associated with one or more shapes of the circuit design that neighbor the select wire-end gap, each avoidance region designating an area of the circuit design where the select etching shape should avoid overlap;
   determining, based on the one or more avoidance regions, one or more available regions designating an area of the circuit design where the select etching shape is permitted to overlap; and
   determining, based on the one or more available regions, the variable height and the location.

4. The non-transitory computer-readable medium of claim 3, wherein the determining of the one or more avoidance regions associated with the one or more shapes comprises:
   determining at least one avoidance region of the one or more avoidance regions based on a minimum vertical space required between the etching shape and at least one of the one or more shapes, the minimum vertical space being defined by the spacing rule.

5. The non-transitory computer-readable medium of claim 3, wherein the etching shape is a new etching shape, and wherein the determining of the one or more avoidance regions associated with the one or more shapes comprises:
   determining at least one avoidance region of the one or more avoidance regions based on a minimum vertical space required between the new etching shape and another etching shape applied to at least one of the one or more shapes, the minimum vertical space being defined by the spacing rule.

6. The non-transitory computer-readable medium of claim 1, wherein the operations further comprise:
   prior to placement of an individual block in the circuit design:
      determining whether the individual block comprises at least one wire having at least one end located within a predetermined distance from a boundary associated the individual block; and
      in response to determining that the individual block comprises the at least one wire having the at least one end located within the predetermined distance from the boundary, inserting an individual etching shape in the individual block with respect to the at least one end; and
   performing one or more placements of the individual block in the circuit design.

7. The non-transitory computer-readable medium of claim 6, wherein the individual etching shape is inserted with respect to the at least one end such that the individual etching shape is placed within the boundary associated with the individual block and with one edge of the individual etching shape touching the boundary.

8. The non-transitory computer-readable medium of claim 6, wherein the individual etching shape is inserted with respect to the at least one end such that the individual etching shape is placed on the boundary associated with the individual block.

9. The non-transitory computer-readable medium of claim 6, wherein the individual etching shape is inserted with respect to the at least one end such that the individual etching shape is placed outside the boundary associated with the individual block and with one edge of the individual etching shape touching the boundary.

10. The non-transitory computer-readable medium of claim 6, wherein the inserting of the individual etching shape with respect to the at least one end comprises:
    placing a dummy edge in proximity to the boundary associated with the individual block, the at least one end and the dummy edge forming a temporary wire-end gap; and
    inserting the individual etching shape with respect to the temporary wire-end gap.

11. The non-transitory computer-readable medium of claim 10, wherein the dummy edge is placed relative to the boundary such that the temporary wire-end gap satisfies the condition for insertion of one or more etching shapes.

12. A method comprising:
    accessing, by a hardware processor, circuit data that describes a set of wires of a circuit design;
    determining, by the hardware processor, a set of wire-end gaps based on the set of wires, each wire-end gap comprising a space between ends of two wires of the set of wires;
    determining, by the hardware processor, a select wire-end gap in the set of wire-end gaps that satisfies a condition for insertion of one or more etching shapes with respect to the select wire-end gap;

determining, by the hardware processor, a select area of the circuit design that includes the select wire-end gap;

determining, by the hardware processor, that a set of variable height rules applies to the select area; and in response to determining that the set of variable height rules applies to the select area, inserting, by the hardware processor, a select etching shape in the circuit design with respect to the select wire-end gap, the select etching shape having a variable height determined based on at least one variable height rule in the set of variable height rules.

13. The method of claim 12, wherein the inserting of the select etching shape with respect to the select wire-end gap comprises:

determining the variable height and a location of the select etching shape within the select wire-end gap such that select etching shape avoids creating a new violation of a spacing rule.

14. The method of claim 13, wherein the determining of the variable height and the location of the select etching shape comprises:

determining one or more avoidance regions associated with one or more shapes of the circuit design that neighbor the select wire-end gap, each avoidance region designating an area of the circuit design where the select etching shape should avoid overlap;

determining, based on the one or more avoidance regions, one or more available regions designating an area of the circuit design where the select etching shape is permitted to overlap; and determining, based on the one or more available regions, the variable height and the location.

15. The method of claim 14, wherein the determining of the one or more avoidance regions associated with the one or more shapes comprises:

determining at least one avoidance region of the one or more avoidance regions based on a minimum vertical space required between the etching shape and at least one of the one or more shapes, the minimum vertical space being defined by the spacing rule.

16. The method of claim 14, wherein the etching shape is a new etching shape, and wherein the determining of the one or more avoidance regions associated with the one or more shapes comprises:

determining at least one avoidance region of the one or more avoidance regions based on a minimum vertical space required between the new etching shape and another etching shape applied to at least one of the one or more shapes, the minimum vertical space being defined by the spacing rule.

17. The method of claim 12, wherein the circuit data describes a set of blocks of a circuit design, and wherein the method further comprises:

prior to placement of an individual block in the circuit design:

determining, by the hardware processor, that the individual block comprises at least one wire having at least one end located within a predetermined distance from a boundary associated the individual block; and in response to determining that the individual block comprises the at least one wire having the at least one end located within the predetermined distance from the boundary, inserting, by the hardware processor, an individual etching shape in the individual block with respect to the at least one end; and performing, by the hardware processor, one or more placements of the individual block in the circuit design.

18. The method of claim 17, wherein the inserting of the individual etching shape with respect to the at least one end comprises:

placing a dummy edge in proximity to the boundary associated with the individual block, the at least one end and the dummy edge forming a temporary wire-end gap; and inserting the individual etching shape with respect to the temporary wire-end gap.

19. The method of claim 18, wherein the dummy edge is placed relative to the boundary such that the temporary wire-end gap satisfies the condition for insertion of one or more etching shapes.

20. A device comprising:

a memory storing instructions; and a hardware processor communicatively coupled to the memory and configured by the instructions to perform operations comprising:

determining a set of wire-end gaps based on a set of wires of a circuit design, each wire-end gap comprising a space between ends of two wires of the set of wires;

determining a select wire-end gap in the set of wire-end gaps that satisfies a condition for insertion of one or more etching shapes with respect to the select wire-end gap;

determining a select area of the circuit design that includes the select wire-end gap;

determining whether a set of variable height rules applies to the select area or a fixed height rule applies to the select area; and in response to determining that the set of variable height rules applies to the select area, inserting a select etching shape in the circuit design with respect to the select wire-end gap, the select etching shape having a variable height determined based on at least one variable height rule in the set of variable height rules.

* * * * *